J. E. WOODLAND.
SAFETY DEVICE FOR MOTION PICTURE MACHINES.
APPLICATION FILED NOV. 11, 1920.
1,407,616. Patented Feb. 21, 1922.
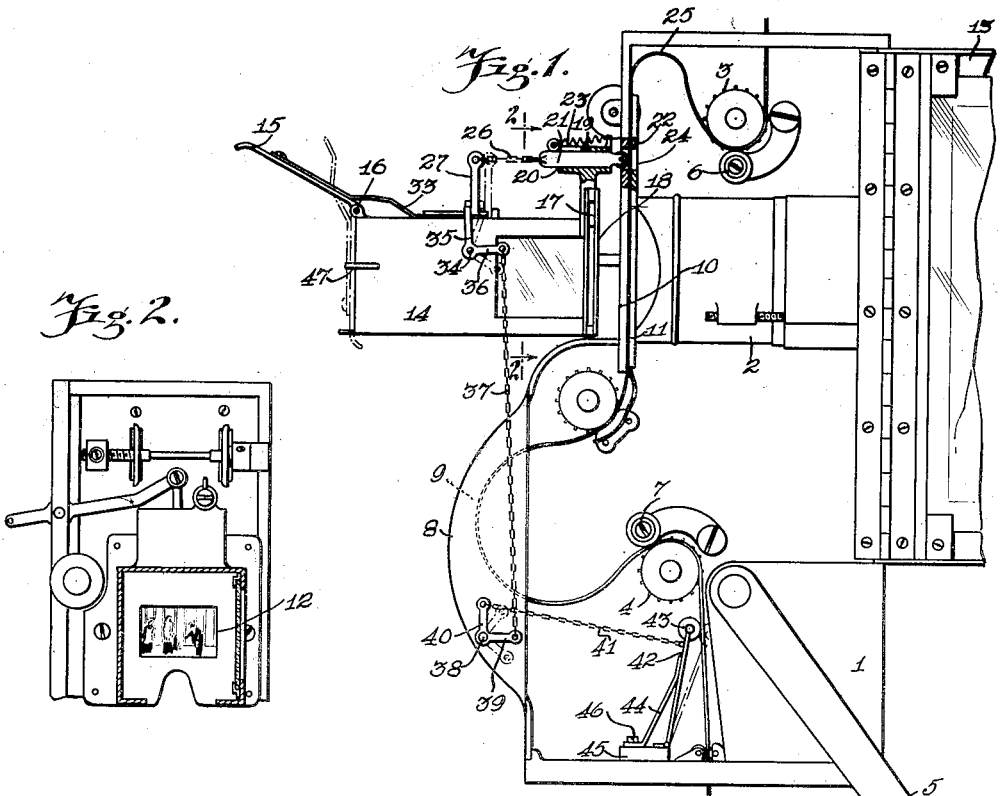
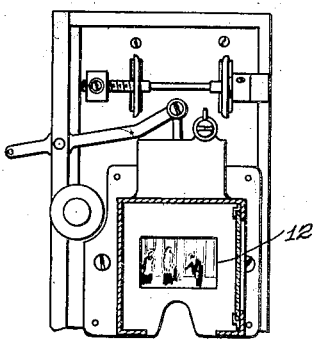
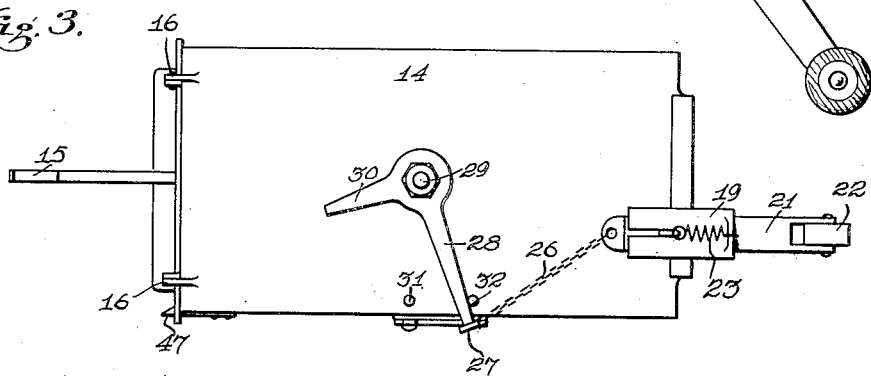
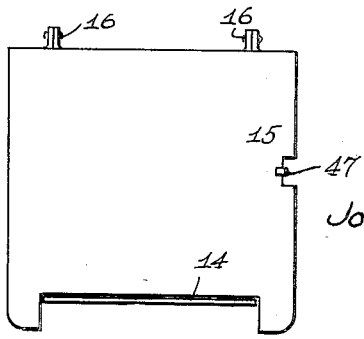
WITNESSES
Thos. H. Leitman
Robert I. Hulsizer
INVENTOR
JOHN E. WOODLAND
BY Mmm Co
ATTORNEYS

UNITED STATES PATENT OFFICE.

JOHN E. WOODLAND, OF BROOKLYN, NEW YORK.

SAFETY DEVICE FOR MOTION-PICTURE MACHINES.

1,407,616.   Specification of Letters Patent.   Patented Feb. 21, 1922.

Application filed November 11, 1920. Serial No. 423,403.

*To all whom it may concern:*

Be it known that I, JOHN E. WOODLAND, a citizen of the United States, and a resident of the city of New York, borough of Brooklyn, in the county of Kings and State of New York, have invented a new and Improved Safety Device for Motion-Picture Machines, of which the following is a full, clear, and exact description.

This invention relates to a safety device for moving-picture machines, and has for its object the provision of a simple, compact apparatus which can be applied to any type of moving-picture machine and which operates to cut off the light from the celluloid film whenever the film breaks or becomes disarranged.

Another object resides in the provision of means whereby this safety device is operated whenever the film breaks at a plurality of points throughout its length.

A further object resides in the provision of means whereby this apparatus can be readily reset upon the repair of the film.

A still further object resides in the provision of means whereby a shield is interposed between the light and the film whenever the film breaks or becomes disarranged independent of the speed of the power mechanism operating the film.

Another object resides in the provision of the particular mechanical arrangement and construction of the parts hereinafter described and claimed and shown in the accompanying drawings.

In the use of motion-picture projectors devices have been provided whereby a screen is interposed between the film and the light whenever the motor slows down below a certain minimum speed, to protect the film from the heat of the arc. However, devices of this kind are not adapted to act unless the motor slows down, so that if a film breaks the motor does not necessarily stop and the shield, therefore, does not necessarily prevent the film from burning.

My invention aims to provide a simple, compact apparatus which can be attached to any type of machine, and comprises a shield normally disposed out of the path of the light and connected by a suitable linkage to certain operating parts associated with the film during its motion at several points throughout its length whereby when the film breaks these parts are actuated and their actuation results in the interposition of the shield between the film and the light. This is extremely important in the motion-picture field, since, whenever anything happens to the film the ordinary speed-controlled shield does not operate unless the motor stops, whereas some shield must be interposed between the light whether the motor is running or not in order to prevent the destruction of the film and the consequent liability to fires in theatres where these machines are used.

The invention is illustrated in the drawings, of which—

Figure 1 is a side view of a portion of a projector to which my invention is applied;

Figure 2 is a section taken on the line 2—2 of Figure 1;

Figure 3 is an enlarged detail plan view of my device; and

Figure 4 is an elevation of part of my device.

As shown in the drawings, the invention is applied to a projector or moving-picture machine of any type. This machine comprises a metal casing 1 which can be supported on any suitable standard (not shown). This casing contains a lens unit, represented by the numeral 2, and suitable pinions 3 and 4 adapted to be actuated by suitable mechanism connected to an operating handle 5. It is, of course, understood that these pinions can be operated by a motor mechanism rather than by a handle such as 5. Clamping rollers 6 and 7 are disposed against the film in the usual manner. The rear portion of the casing 1 is flared outwardly and rearwardly, as shown at 8, to provide space for a loop 9 in the film. The film is received from a reel above the projector (not shown) and passes down between suitable guideways 10 and 11 and past an aperture 12 in these guideways. The side of the casing 1 may be closed by any suitable means, such as a door 13.

My safety device is applied against the rear of the casing in line with the aperture 12 above mentioned. This safety device comprises a boxlike, metallic structure 14 the front end of which is open in alignment with the aperture 12, and the rear end of which is normally open but is adapted to be closed by a metallic shield 15 which is pivoted as at 16 to an upper edge of the box 14. The box 14 can be attached to the frame of the projector or moving-picture machine in any suitable manner, but as shown in Figure 1 it is provided with a turned-down flange portion 17 which can be inserted in a suitable guideway 18, which is part of the frame of the machine. The forward upper face of the box 14 is provided with a bearing portion 19 having a bore 20 therein in which is adapted to slide a bar 21 on the outer end of which is a roller 22. The roller 22 is constantly urged forward by a spring 23 connected to the bar 21 at one end and at the other end to a portion of the bearing 19. The roller 22 on the end of this bar 21 is adapted to extend through an aperture 24 which may be pierced through the frame of the machine at some point in the length of the guideways 10 and 11. The tendency of the roller and the bar 21 is to extend through this aperture, but when the film 25 is in place between these guideways 10 and 11 the roller bears against the same.

The rear end of the bar 21 is connected by suitable link mechanism 26 to an upwardly extending portion 27 on the lever 28. This lever 28 is pivoted on the upper face of the box 14 at point 29 and has an integral arm 30 extending in another direction from the lever arm 28. The movement of the lever arm 28 across the face of the box 14 is limited by pins 31 and 32. The lever arms 28 and 30 lie flat on top of the box 14, whereas the arm 27 extends upwardly from the other end of the arm 28.

When the parts are in the position shown in Figure 1, the lever arm 28 is disposed adjacent and against the stop 31 and the roller 22 is bearing against the film 25 as it passes the aperture 24. Likewise, the arm 30 is disposed along the middle line of the upper face of the box 14, and in this position is disposed over the forward end of an arm 33 which extends from one end of the metallic shield or plate 15, whereby this plate 15 is held in the open position shown in Figure 1.

A bell crank lever is pivoted as at 34 on the side of the box 14 adjacent the end of the arm 28 extending over the edge of the box 14 and comprising a lever arm 35 adapted to extend upwardly and engage with the side of the end of arm 28 in the position shown in Figure 1, and in addition comprises another arm 36 extending integrally and at an angle along the side of box 14 and the arm 35. The upper end of this arm 36 is connected by some suitable linkage or chain 37 with another bell crank lever pivoted at 38 on the casing 1 of the machine adjacent its rearwardly flared portion 8, above mentioned, and on the side thereof. This bell crank lever comprises an arm 39 which is at its outer end connected to the linkage 37 above mentioned, and an arm 40 which is connected by a link 41 to a spring-pressed lever 42. This spring-pressed lever 42 has a roller 43 on its outer end which is adapted to bear against the film 25. This lever is pressed against the film with the desired pressure by a spring 44. Both the spring 44 and the lever 42 are mounted on a suitable base portion 45 connected to the base of the casing 1. The spring 44 is connected to the base portion 45 by a screw 46 which can be adjusted so that the spring 44 can be moved to one side to release the lever 42 if it is desired to remove the lever and the roller 43 from the film 25.

In the position of the various parts shown in Figure 1, both the roller 43 and the roller 22 are bearing against a film. If, for any reason, something happens to the film so that the tension therein is lessened, or if the film becomes disarranged or breaks, then the spring pressure back of these rollers forces them in the direction indicated. If the roller 43 can move forward under the action of spring 44, then the arm 35 is actuated through the linkage above mentioned to move the arm 28. This movement of the arm 28 from the stop 31 to stop 32 causes arm 30 to move sideways and release arm 33 connected to the shield 15. The shield 15 thereupon drops into the position shown in dotted line in Figure 1 and closes the open end of the box 14. This box then falls in the line of the light from the source of light to the film, when the shield 15 drops, the light is cut off from the film, and the heat of the light is also prevented from injuring the film. As the shield 15 drops, a spring-pressed latch 47 of any suitable type automatically catches the shield to hold it in this downward position until released.

I claim:

1. An attachment for moving picture machines, which comprises a hollow casing adapted to be connected to the apparatus adjacent the film aperture and in the line of the light, a shutter or shield adapted to close one end of the casing, means for engaging the shield normally to hold it out of the path of the light, means bearing against the film, a connection between the means bearing against the film and the shield engaging means whereby the variation in the tension of the film will cause the movement of the member bearing thereagainst and thereby move the shield engaging means to release the shield which will then introduce itself between the film and the light to protect the film.

2. An attachment for moving picture machines which comprises a hollow casing adapted to be fastened to the outside of the machine adjacent the film aperture and in the path of the light, a shield or shutter adapted to close one end of said casing when released and normally held out of the path of the light, means on the casing for engaging said shutter to hold it normally out of the path of the light, a member bearing against the film adjacent the casing, means for resiliently pressing said member against the film, a connection between said member and the shield-engaging means, a second member bearing against the film at a different point, resilient means to press said second member against the film, a lever disposed against the side of the casing having one portion disposed in contact with the shield-engaging means, and a connection between said lever and the second member bearing against the film whereby the movement of either of the members bearing against the film, due to a variation in the tension of the film, will cause the movement of the means engaging the shield to permit the shield to drop into the path of the light.

3. An attachment for moving picture machines which comprises a hollow casing adapted to be fastened to the outside of the machine adjacent the film aperture and in the path of the light, a shield or shutter adapted to close one end of said casing when released and normally held out of the path of the light, means on the casing for engaging said shutter to hold it normally out of the path of the light, a member bearing against the film adjacent the casing, means for resiliently pressing said member against the film, a connection between said member and the shield-engaging means, a second member bearing against the film at a different point, resilient means to press said second member against the film, a lever disposed against the side of the casing having one portion disposed in contact with the shield-engaging means, a connection between said lever and the second member bearing against the film whereby the movement of either of the members bearing against the film, due to a variation in tension of the film, will cause the movement of the means engaging the shield to permit the shield to drop into the path of the light, and a latching means on the casing adapted to latch the shield in its closed position after it has dropped into the path of the light.

JOHN E. WOODLAND.